United States Patent

Ferguson

[11] 3,907,848
[45] Sept. 23, 1975

[54] ORGANIC TITANIUM AND SILICON CONTAINING COMPOUNDS

[75] Inventor: Ian Ferguson, Manchester, England

[73] Assignee: Imperial Chemical Industries Limited, London, England

[22] Filed: July 20, 1973

[21] Appl. No.: 381,225

[30] Foreign Application Priority Data
July 24, 1972 United Kingdom............... 34477/72

[52] U.S. Cl. .............. 260/429.5; 106/299; 252/8.6; 252/8.8; 260/46.5
[51] Int. Cl. .............................................. C07f 7/28
[58] Field of Search................................. 260/429.5

[56] References Cited
UNITED STATES PATENTS

| | | | |
|---|---|---|---|
| 2,716,656 | 8/1955 | Boyd.................................. | 260/429.5 |
| 3,047,515 | 7/1962 | Piirma............................... | 260/429.5 |
| 3,763,197 | 10/1973 | Collier.......................... | 260/429.5 X |

FOREIGN PATENTS OR APPLICATIONS

| | | |
|---|---|---|
| 728,751 | 4/1955 | United Kingdom |
| 804,097 | 1968 | United Kingdom |

OTHER PUBLICATIONS
Chem. Abstracts, Vol. 53, 16587a, (1959).

*Primary Examiner*—Helen M. S. Sneed
*Attorney, Agent, or Firm*—Cushman, Darby & Cushman

[57] ABSTRACT

Compounds of the general formula:

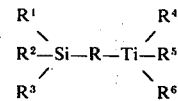

wherein $R^1$, $R^2$ and $R^3$ are selected from the group consisting of organic groups and organosilicon groups, $R^4$ and $R^5$ each have not more than 20 carbon atoms and are selected from the group consisting of alkoxy, alkenoxy, acyloxy, trialkylsiloxy groups and groups capable of forming a co-ordinate bond with titanium by donating two electrons from constituent oxygen, nitrogen or sulphur, $R^6$ has not more than 20 carbon atoms and is selected from the group consisting of alkoxy, alkenoxy, acyloxy and trialkylsiloxy groups and groups of the general formula:

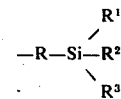

and R is a divalent organic group.

4 Claims, No Drawings

ORGANIC TITANIUM AND SILICON CONTAINING COMPOUNDS

This invention relates to a new and useful class of organic titanium compounds and more particularly to a class of such compounds containing silicon.

A wide variety of compounds containing titanium and silicon are known. In these, however, the silicon is joined to the titanium through an oxygen atom. These compounds suffer from sundry disadvantages, for example, lack of compatibility with many polymer systems. This imposes serious limitations on their uses.

According to the present invention a new and useful class of organic titanium compounds containing silicon comprises compounds of the general formula:

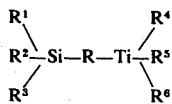

where $R^1$, $R^2$ and $R^3$, which may or may not be alike, are organo groups or organosilicon groups, $R^4$, $R^5$ and $R^6$, which may or may not be alike and each of which has not more than 20 carbon atoms, may be alkoxy, alkenoxy, acyloxy or trialkylsiloxy groups or one or two of them may be groups, capable of forming a coordinate bond with titanium by donating two electrons from constituent oxygen, nitrogen or sulphur or one of them may be a group:

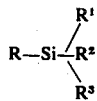

and R is a divalent organic group.

The groups $R^1$, $R^2$ and $R^3$ may be organic groups or organo-silicon groups such as, for example, alkyl, aryl, alkoxy, aroxy, aralkyl, aralkoxy, alkaryl, alkenyl, cycloalkenyl, cycloalkyl, amino-alkoxy, N,N-dialkylaminoxy, N-N-dialkylamino, cyclo-alkylamino, acylamido, imidato, isocyanato, iminoxy, ureido, carbamyloxy, phosphato, polyorganosiloxanoxy, silyl, siloxy, disilanyl, disilanoxy or disilanoxy groups having additional organic groups of the type $R^1$, $R^2$ or $R^3$ attached to silicon. The choice of groups will depend on whether the compound is required to be hydrolysable or non-hydrolysable and on the particular purpose for which the compound is desired. For many purposes it is preferred that at least one of the groups $R^1$, $R^2$ and $R^3$ attached to silicon should be hydrolysable or that one or more of these groups should contain one or more silicon atoms to which one or more hydrolysable groups is attached. Suitable groups include, for example, methyl, ethyl, propyl, butyl, pentyl, heptyl, hexyl, octyl, nonyl, decyl, undecyl, dodecyl, octadecyl, methoxy, ethoxy, propoxy, butoxy, β-methoxyethoxy, acetoxy, N,N-diethylaminoxy, N,N-dimethylaminoethoxy, polydimethylsiloxanoxy, phenyl, benzyl, phenylethyl, xylyl, tolyl, vinyl, allyl, dimethylketoximo, acetaldoximo, methylethylketoximo, ethyl propionimidato and 2,3-dimethylbuta-2,3-dioxy groups. It is preferred that the groups $R^1$, $R^2$ and $R^3$ be selected from alkyl groups having not more than 20 carbon atoms, phenyl groups, alkoxy, acyloxy and aminoalkoxy groups having not more than 4 carbon atoms, dialkyl ketoximo groups when the alkyl substituents have not more than 4 carbon atoms, polydimethylsiloxanoxy and polydiphenylsiloxanoxy groups. Particularly suitable groups for certain purposes are polymethylsiloxanoxy, polymethyl(methoxyethoxy)siloxanoxy, ethoxy, β-methoxyethoxy, isopropoxy and N,N-diethyl aminoxy groups.

Suitable types of groups $R^4$, $R^5$ and $R^6$ include for example, alkoxy, carboxy, dicarboxy, hydroxycarboxy, aminoalkoxy, diketoxy and ketoxyester groups. Suitable groups include for example, isopropoxy, butoxy, acetoxy, aminoxy, dimethylaminoxy, acetylacetoxy, ethylacetylacetoxy, 4-ketopent-2-ene-2-oxy and 2-hydroxypropionoxy groups.

As already stated, one or two of the groups $R^4$, $R^5$ and $R^6$ may be groups capable of forming a co-ordinate bond with titanium by donating two electrons from constituent oxygen, nitrogen or sulphur. Classes of compounds capable of forming these co-ordinate bonds include α and β-diketones, α and β-keto alcohols, α and β-ketonic acids, α and β-ketonic acid esters, glycols, hydroxy acids, dicarboxylic acids, alkanolamines. Suitable compounds include methylacetoacetate, ethylacetoacetate, acetylacetone, benzoylacetone, dibenzoylmethane, triethanolamine, β-aminoethylethanolamine, 1,1,3-trimethyl 1,3-propane-diol, 2-ethyl-1,3-hexane-diol, and methyl salicylate. In many cases it is preferred that two of the groups $R^4$, $R^5$ and $R^6$ be 4-ketopent-2-ene-2-oxy, ethylacetylacetoxy or amino-alcoholate groups and that the remaining group be an alkoxy group such as an isopropoxy, butoxy or octoxy group.

The divalent organic group R may be a group of the general formula:

where $n$ is an integer not less than 3 and preferably not more than 12;

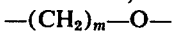

where $m$ is an integer not less than 2 and is preferably 2 or 3;

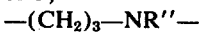

where $R''$ is hydrogen or a lower alkyl group, preferably methyl or ethyl, or

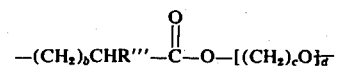

where $b$ is 1 or 2, $c$ is 1, 2, 3 or 4, $d$ is 0 or 1 and $R'''$ is hydrogen or an alkyl group having not more than 20 carbon atoms. It is, however, frequently preferred that the group R be a —O—CH$_2$CH(CH$_3$)—O— or a —CH$_2$CH$_2$CH$_2$O— group. The compounds of our invention may be prepared in a number of ways. In general, however, a suitable titanium compound is reacted with a difunctional organic compound, i.e., the precursor of group R, in which the two reactive groups, which may or may not be alike, have different reactivities, after which the compound so obtained is reacted with a suitable silicon compound. Alternatively the silicon compound may first be reacted with one of the functional groups on the difunctional organic compound and the titanium compound thereafter reacted with the so obtained product.

Suitable kinds of difunctional organic compounds which may be used include, for example, diols having hydroxyl groups of differing reactivity, triol monoesters, N-alkylallylamines, 2-alkylacrylic acid amides, hydroxyalkyl acrylates, hydroxyalkyl-2-alkyl-acrylates, allyl phenols, terminally unsaturated alcohols and terminally unsaturated carboxylic acids. Suitable compounds which may be used include, for example, 1,2-propyleneglycol, 2-methylpentane-2,4-diol, propargyl alcohol, allyloxyethanol, ricinoleic acid, ricinelaidic acid, hydroxy-stearic acids, glycollic acid, lactic acid, acids of the formulae $CH_2=CR'''COOH$ where $R'''$ is an alkyl group having not more than 20 carbon atoms, $CH_2=CHCH_2O(CH_2)_gCOOH$ where $g$ is 1, 2, 3 or 4, or $CH_2=CH(CH_2)_eCOOH$ where $e$ is an integer not greater than 20, hydroxybenzoic acids, propylene glycol monoallyl ether, allyl glycidyl ether, glycerol monostearate, glycerol mono-acetate, allylamine, acrylamide, allyl alcohol.

Suitable silicon compounds which may be used in the preparation of the compounds of our invention include, for example, silanes of the general formula $R^1R^2R^3SiA$ where $R^1$, $R^2$ and $R^3$ are as hereinbefore defined and A is hydrogen, a halogen or an alkoxy, aroxy, aralkoxy, acyloxy, aminoalkoxy, dialkylaminoxy, N,N-dialkylamino, cycloalkylamino, acylamido, imidato, isocyanato, iminoxy, ureido, carbamyloxy or phosphato group.

Suitable silanes include for example, tetraethoxysilane, methyltriethoxysilane, tetramethoxysilane, methyl trimethoxysilane, methyl triisopropoxy silane, methyl tributoxysilane, methyl trichlorosilane, dimethyldiethoxysilane, phenyl triethoxysilane, methyltriacetoxy silane, methyl tris(dimethylaminoethoxy)silane, and methyl tris(diethylaminoxy) silane.

Many types of polysiloxanes may be employed to prepare the compounds of our invention. Suitable polysiloxanes include those containing SiH groups or Si-A groups where A is as hereinbefore defined. They may range from low molecular weight liquids to high molecular weight gums. They may also include resins containing mixtures of monofunctional, difunctional, trifunctional and tetrafunctional units.

Suitable polysiloxanes may be of the average general formula:

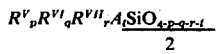

$$\frac{R^V_pR^{VI}_qR^{VII}_rA_tSiO_{4-p-q-r-t}}{2}$$

where $R^V$, $R^{VI}$, $R^{VII}$ are alkyl, aryl, aralkyl, alkaryl, alkenyl or cycloalkenyl groups, A is as hereinbefore defined, $p$, $q$ and $r$ are numbers from 1 to 2, $t$ is a number not greater than 1 and the sum of $p+q+r+t$ is from 2 to 3.

Suitable titanium compounds which may be used to prepare the compounds of our invention include, for example, those of the general formula $TiR^4R^5R^6R^7$ where $R^4$, $R^5$ and $R^6$ are as hereinbefore defined and $R^7$ is selected from the same group as $R^4$, $R^5$ and $R^6$. Suitable compounds include, for example, titanium tetraisopropoxide, titanium tetrabutoxide, titanium diisopropoxide diacetylacetonate and titanium diisopropoxide diethylacetoacetate.

The products of our invention have a wide variety of useful applications. These include, for example, use as crosslinking agents for silicone rubbers, detergent resistant additives for polishes, surface treatments for particulate materials including fillers and pigments and for plastics, metals, glass, natural and synthetic stone and as waterproofing and release agents.

Our invention is further illustrated by the following examples in which all parts and percentages are by weight.

EXAMPLE 1.

85.2 parts of titanium isopropoxide, 17.4 parts of allyl alcohol and 60 parts of acetylacetone were heated together with stirring. 54 parts of isopropanol were distilled off during the reaction and the pot temperature reached a maximum of 155°C. The product was cooled to 40°C and 0.0012 part of a trans bis-diethylsulphide-platinum II complex added as catalyst followed by 532 parts of a siloxane of average formula $Me_3Si(OSiMe_2)_{3-6}(OSiMeH)_{12}OSiMe_3$. The mixture was heated to about 80°C at which temperature reaction commenced with evolution of heat. The temperature was allowed to rise to 108°C. When reaction was completed, 114 parts of ethylene-glycol-monoethyl-ether and 1.0 part of stannous octoate was added slowly. The temperature rose to 120°C where it was maintained until evolution of hydrogen ceased. Filtration gave 245 parts of a clear, pale red coloured liquid. Elemental analysis gave C 35.86, H 7,8, O 26.2, Si 27.44, Ti 1.94 % (Theoretical C 36.12, H 7.82, O 26.37, Si 27.8, Ti 1.9%). Infrared and NMR spectroscopic examinations together with the elemental analyses were consistent with the supposed structure.

The product so obtained was used as a constituent of a detergent resistant polish as follows:

Two mixtures A and B were made up containing:

|     |                                              | Parts |
| --- | -------------------------------------------- | ----- |
| (A) | Synthetic Montan Wax                         | 2.4   |
|     | Paraffin Wax                                 | 0.2   |
|     | Bleached Beeswax                             | 0.3   |
|     | Sorbitan mono-oleate                         | 1.5   |
|     | Hydrocarbon solvent                          | 34.05 |
|     | Titanium chelate product prepared as described above | 2.75  |
| (B) | Polyethylene sorbitan mono-oleate            | 0.5   |
|     | Water                                        | 58.5  |

Both mixtures were heated, separately, to 90°C and stirred for 5 minutes. Mixture B was then added to Mixture A slowly with stirring and the whole cooled to 40°C over a period of 15 minutes. The product was homogenised by conventional means at 40°C. When cooled, it was applied to a melamine-formaldehyde-faced, paper-based, laminate and burnished in the usual way. On being subjected to repeated detergent washes, the presence of the titanium compound was found to impart durability and gloss retention.

The product was also used as an additive to a metal polish by adding to a conventional copper or brass metal polish in an amount equal to 10 per cent by weight of the polish. The resultant polish-protectant was applied to copper sheeting and burnished with a soft cloth. After four months exposure in an indoor environment, the copper sheeting which has been treated with the polish containing the titanium compound had retained its original highly polished appearance whereas control sheeting treated with the conventional polish had a more dull, soiled appearance.

A silicone rubber prepared to the following formula showed a significant improvement in adhesion to metal surfaces and also to glass, brick and stonework compared with a similar rubber formulated without the use of the Ti chelate.

| | Parts |
|---|---|
| αωdihydroxy dimethyl polysiloxane of viscosity 3500 cS | 100 |
| Ti compound prepared as described above | 26 |
| Treated Silica filler | 21 |
| Methyltriacetoxysilane | 8 |

This rubber was used to cement together two concrete blocks measuring 3 inches × 3 inches × 1¼ inches and using ½ inch of rubber between the blocks. After curing and 7 days immersion under water the bond between the rubber and the concrete was intact and required a considerable force to destroy. A similar test conducted using a polydimethylsiloxane fluid in place of the Ti compound described above resulted in a rubber-concrete bond which was easily destroyed after 7 days immersion in water.

EXAMPLE 2.

10.0 parts 1,2-propan-diol and 167 parts of toluene were dried by heating under reflux. 106.2 parts of diisopropoxy titanium diethylacetoacetate were added thereto and the mixture heated to reflux temperature. Heating under reflux with stirring was continued until 23 parts of isopropanol were removed. The mixture was cooled to 40°C and 66.1 parts of tetraisopropoxysilane added thereto. The temperature was again raised to the reflux temperature and 27.5 parts of isopropanol removed by distillation. Toluene was thereafter removed by vacuum distillation to give 151.2 parts of product. Elemental analysis gave C 47.20; H 7.66; Si 4.58; Ti 8.11 per cent (Theoretical: C 47.85; H 7.64; Si 4.65; Ti 7.96 per cent.

10 parts of nitrocellulose (11.2 per cent nitrogen content) were dissolved in a mixture of 100 parts of dry methanol and 10 parts of dry ethylene glycol monoethyl ether acetate. 10 parts of the product prepared as described above were added than 0.2 part of dibutyltin dilaurate. After thorough mixing, films were prepared by allowing the solution to evaporate from various substrates. Films were obtained which were harder, more adhesive and more water resistant than controls containing no titanium-silicon derivative.

The product was also useful in giving improved bath-life in a paper release system as follows:

| | Parts |
|---|---|
| Hydroxyl-ended dimethylpolysiloxane of viscosity 900 cs at 20°C | 100 |
| Ethyl orthosilicate | 20 |
| Titanium-silicon compound prepared as described above | 5 |
| Dibutyltin diacerate | 5 |

This composition had a viscosity of 1700 cS at 25°C and this increased slowly until it gelled after 2 days storage. A similar composition in which the titanium-silicon compound prepared as above, was omitted became a gel within a few hours. Such a composition would not be acceptable for commercial manufacture.

EXAMPLE 3.

20 parts of dried 1.2-propylene glycol was heated to 80°C with 0.75 part of stannous octoate and 42 parts of triethoxysilane added slowly thereto. Hydrogen was evolved and the temperature rose to 106°–110°C where it was maintained for one hour by which time hydrogen evolution had ceased. 71 parts of titanium tetraisopropoxide were then added and 13.6 parts of isopropanol removed by distillation. 65 parts of dry ethylacetoacetate were added and a further 30 parts os isopropanol distilled off. The 140 parts of product was a clear orange coloured liquid. Elemental analysis gave; C 47.8; H 7.58; O 31.2; Si 4.72; Ti 8.14 per cent (Theoretical: C 47.85; H 7.64; O 31.9; Si 4.65; Ti 7.96 per cent).

This product was incorporated into a silicone rubber by mixing together:

| | Parts |
|---|---|
| Surface treated calcium carbonate | 40 |
| αωdihydroxydimethyl polysiloxane of viscosity 3000 cS | 60 |
| Ti-compound prepared as described above | 6 |
| Dibutyltin dilaurate | 0.5 |

The mixture cured to a rubber over a period of several hours. The material is useful in that it has a "tack-free" time of 5 to 10 minutes although its "pot life" is at least two hours. This combination of curing characteristics is particularly useful.

EXAMPLE 4.

71.1 parts of titanium tetraisopropoxide were dissolved in 174 parts of toluene and 36.1 parts of hydroxypropylmethacrylate were added and heated to reflux with stirring. Heating was maintained till 25.9 parts of isopropanol/toluene azeotrope had been collected. 0.016 part of a trans bis-diethylsulphide - platinum II complex was added followed by 33.6 parts of methyldiethoxysilane which was added over 20 mins while maintaining the reflux. The reaction mixture was heated at reflux for 1½ hours. During this period the steady decrease in the amount of double bond present was followed in Infrared Spectroscopy. The reaction mixture was cooled, 65.1 parts of ethylacetoacetate added and the mixture heated to reflux and maintained thereat while 51.8 parts of isopropanol/toluene azeotrope were removed. Toluene was removed by vacuum distillation to yield 149 parts of a reddish coloured product. Elemental analysis gave: C 51.03; H 7.57; O 29.61; Si 4.35; Ti 7.41 per cent (Theoretical: C 50.50; H 7.78; O 29.90; Si 4.35; Ti 7.47 per cent).

Infrared and NMR spectroscopic examination together with the elemental analysis were consistent with the expected structure.

We claim:

1. Compounds of the formula

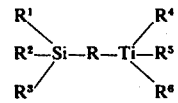

wherein $R^1$, $R^2$ and $R^3$ are selected from the group consisting of methyl, polydimethylsiloxanoxy, polymethyl(methoxyethoxy)siloxanoxy, ethoxy, β-methoxyethoxy, isopropoxy and N,N-diethylamino groups;

$R^4$ and $R^5$ are selected from the group consisting of 4-ketopent-2-one-2-oxy, ethylacetylacetoxy and aminoaliphatic groups;

$R^6$ is alkoxy; and

R is selected from the group consisting of —O—(CH$_2$)$_n$—O wherein $n$ is an integer not less than 3. $-(CH_2)_mO-$ wherein $M$ is an integer not less than 2, $-(CH_2)_3-NR''-$ wherein $R''$ is selected from the group consisting of hydrogen and lower alkyl, and

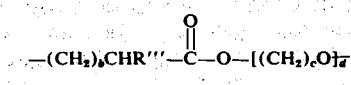

wherein $b$ is 1 or 2, $c$ is 1, 2, 3 or 4, $d$ is 0 or 1 and $R'''$ is selected from the group consisting of hydrogen and alkyl having not more than 20 carbon atoms.

2. Compounds of the formula

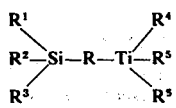

wherein $R^1$, $R^2$ and $R^3$ are selected from the group consisting of methyl, polydimethylsiloxanoxy, polymethyl (methoxyethoxy) siloxanoxy, ethoxy, β-methoxyethoxy, isopropoxy and N,N-diethylamino groups;

$R^4$ and $R^5$ are selected from the group consisting of 4-ketopent-2-one-2-oxy, ethylacetylacetoxy and aminoaliphatic groups;

$R^6$ is alkoxy; and

R is selected from the group consisting of $-OCH_2CH(CH_3)O-$ and $-CH_2CH_2CH_2O-$.

3. Compounds of claim 2 wherein $R^6$ is alkoxy selected from the group consisting of isopropoxy, butoxy and octoxy.

4. Compounds according to claim 1 wherein the alkoxy group is selected from the group consisting of isopropoxy, butoxy and octoxy groups.

* * * * *